United States Patent [19]

Schnabel et al.

[11] 4,180,056

[45] Dec. 25, 1979

[54] LAMINAR SOLAR ENERGY COLLECTING UNIT HAVING ABSORBER PLATES CONSISTING OF HOLLOW FIBERS

[75] Inventors: Roland Schnabel, Hofheim; Eckart Hussmann, Oberolm, both of Fed. Rep. of Germany

[73] Assignee: JENAer Glaswerk Schott & Gen., Fed. Rep. of Germany

[21] Appl. No.: 764,228

[22] Filed: Jan. 31, 1977

[30] Foreign Application Priority Data

Apr. 26, 1976 [DE] Fed. Rep. of Germany ....... 2618115

[51] Int. Cl.² .............................................. F24J 3/02
[52] U.S. Cl. ................................................. 126/447
[58] Field of Search .............. 126/270, 271; 237/1 A; 165/169, 170, 174

[56] References Cited

U.S. PATENT DOCUMENTS

| 705,350 | 7/1902 | Hubert | 126/271 |
| 3,859,980 | 1/1975 | Crawfold | 126/271 |
| 3,939,819 | 2/1976 | Minardi | 126/271 |
| 3,952,724 | 4/1976 | Pei | 126/271 |
| 3,981,294 | 9/1976 | Deminet et al. | 126/271 |
| 4,023,557 | 5/1977 | Thorne et al. | 126/271 |

Primary Examiner—James C. Yeung
Attorney, Agent, or Firm—Schwartz & Weinrieb

[57] ABSTRACT

A solar energy collecting unit is disclosed having an absorber for solar radiation comprising at least one hollow fiber having a heat-dissipating medium flowing therethrough. The hollow fibers used are preferably glass fibers, and preferably form the absorbing surface of the collecting unit.

16 Claims, 3 Drawing Figures

LAMINAR SOLAR ENERGY COLLECTING UNIT HAVING ABSORBER PLATES CONSISTING OF HOLLOW FIBERS

BACKGROUND OF THE INVENTION

This invention relates generally to solar energy collectors and more particularly to solar energy collectors utilizing hollow fibers that facilitate the transmission of absorbed heat to the heat dissipating fluid medium used with said solar energy collectors.

Solar energy collectors (solar energy collecting units) for converting the energy of solar radiation into heat, as compared to solar cells, which utilize photoelectric effects, consist of an absorber to absorb the radiation as completely as possible, and a suitable arrangement whereby the heat is conducted from the absorber to either the heat accumulator or directly to the heat-utilizing device by means of a flowing medium (gas or liquid). At the present time, this method of utilizing solar energy is also known as photothermal conversion.

There is a difference between (1) flat or laminar solar energy collecting units and (2) concentration solar energy collecting units. Laminar collecting units are those wherein the incident solar radiation directly strikes the collecting unit, and concentrating collecting units are those wherein the solar radiation is concentrated by means of optical arrangements prior to striking the collecting unit.

The absorber, which is heated by the solar radiation, not only gives off its heat to the transporting or heat dissipation medium, but also loses heat to the ambient atmosphere. Such undesirable losses of heat occur with both concentrating collectors as well as with the laminar or flat collectors.

It is difficult to protect the side of the absorber receiving the solar radiation against heat losses. Heat-insulating arrangements which are arranged on said side of the absorber do in fact have to satisfy the condition that the radiation is able to pass, with the least possible obstruction, through the heat-insulating arrangements. Thus, the side of the absorber receiving the solar radiation should be fully transparent for solar radiation.

Heat losses are caused by heat conduction, convection, and by radiation exchange. Steps which are taken for suppressing these heat losses frequently are only concerned with one of the said types of the heat transfer, however, heat losses in many cases, are caused by more than one type of heat transfer occurring at the same time.

Heat losses of the solar energy collectors due to radiation exchange can be suppressed by various methods. Frequently, selectively reflecting layers are used as absorbers. Coatings on covering panes which are transparent for the solar radiation are likewise effective, but they reflect long-wave infrared. Single or multiple covering panes which are transparent for solar radiation but absorb long-wave infrared, are not as completely effective as the methods described above.

Heat losses due to heat conduction and convection are closely linked to one another with regard to solar energy collectors. For example, with laminar or flat collectors having a plurality of covering panes which are transparent for solar radiation, the distance between the absorber and the pane disposed thereabove, or between two panes, is from an interstice of about 15 mm without any influence on the heat-insulating properties of the arrangement. Any increase in the thickness of the gas layers results in an increase in convection.

One method frequently used for suppressing the heat conduction and convection is to house the absorber in a vessel which is transmissive for the solar radiation to the absorber and is capable of being evacuated. Below a certain pressure, the convection is reliably suppressed. If the pressure is still further reduced, a point is then reached wherein a further lowering of the pressure reduces the heat conduction.

All methods which have been previously referred to have been used in manifold combinations, both with concentrating collecting units and with laminar or flat collecting units.

By way of example, concentrating collectors have selectively reflecting absorber layers, selectively transmitting layers on the covering panes, or both, are known. The enclosing vessels are often evacuated to a greater or lesser degree.

With regards to flat collecting units, experiments have been conducted with many arrangements utilizing selectively reflecting absorber layers and having single or multiple pane coverings.

An additional source of heat loss has been observed with solar energy collectors having conventional blackened metal absorber plates. In these units, heat is removed from said blackened metal plates by means of tubes or ducts having a liquid flowing therethrough. Metal strips are located between the ducts or tubes and the absorber plates for the purpose of conducting heat to the former. Heat losses are believed to occur because the temperature of the metal strips between the tubes and absorber plates is higher than on the said tubes. The heat losses are approximately proportional to the difference between the mean absorber temperature and the external temperature. The mean absorber temperature is proportionally higher when each of the separate liquid-traversed ducts or tubes are disposed further apart from each other. When these ducts or passages are arranged closer to the absorber, smaller heat losses are then observed.

For both economical and constructional reasons, it is not always possible for the spacing between the ducts to be kept as small as desired. In the extreme case only a single wide duct or tube is still used beneath the absorber. However, since the flow in this wide or broad duct or tube should be the same under each part of the absorber, it is only with difficulty that it is possible to dispense with conduction passages.

If pipes are soldered, welded or adhesively bonded beneath a metal absorber plate, then it is prohibitive, for reasons of expense, to supply spiral tubes arranged as close as may be desired.

If absorbers are used in the "roller-bonding technique", then the distances between the ducts or tubes are not to be designed as narrow as may be desired. For reasons of strength, a sufficient distance (usually several centimeters) has to be maintained between the individual ducts or tubes.

An additional, but not less serious, disadvantage of absorbers with ducts having a heat-conducting liquid flowing therethrough is that practically all metals are subject to corrosion. Even copper tubes exhibit some corrosion.

Steel absorbers and aluminum roller-bonded absorbers are only to be operated as closed systems, and even then only with corrosion inhibitors present in the heat-dissipating water being circulated therethrough.

In view of the disadvantages associated with prior art systems, it has often been proposed to make the ducts or tubes of corrosion-resistant, organic synthetic plastic materials. A disadvantage associated with the use of said organic synthetic plastics is that they age quickly at relatively high temperatures and have only a low capacity for heat-conduction. Thus, the solar radiation energy converted on the absorber into heat is only inadequately transmitted to the heat dissipating liquid which is flowing in the tubes.

If a change-over to higher temperatures is made, which is quite possible when utilizing suitable methods for suppressing the heat losses, then most of the aforementioned absorber constructions are not capable of absorbing substantially higher pressures than atmospheric pressure. Excluded are tubular systems of small diameters consisting of metals having good strength properties.

A need therefore exists to provide an improved solar energy collecting unit which completely eliminates the aforementioned disadvantages and difficulties associated with prior art solar collecting units from practically all points of view, or, at least introduces considerable advantages when compared with that which has previously been known.

OBJECTS OF THE INVENTION

A significant object of the present invention is the provision of a solar energy collecting unit wherein the solar radiation is converted into heat and is delivered by the shortest path to a heat-dissipating fluid medium.

Another significant object of this invention is the provision of a solar energy collecting unit that can be simply and economically manufactured.

A still further object of the present invention is the provision of a solar energy collecting unit that is resistant to corrosion and is able to withstand high pressures during use.

BRIEF SUMMARY OF THE INVENTION

Briefly, the present invention relates to a solar energy collecting unit comprising hollow fibers through which a heat-dissipating medium flows. The hollow fibers are used to form the absorption means that receives the solar radiation.

BRIEF DESCRIPTION OF THE DRAWINGS

Various other objects, features, and attendant advantages of the present invention will be more fully appreciated as the same becomes understood from the following detailed description when considered in connection with the accompanying drawings, and wherein.

DETAILED DESCRIPTION OF THE INVENTION

The hollow fibers or capillaries useful in the practice of this invention can be fabricated from any material including glass, metal and synthetic plastics, the preferred material being glass.

The glass compositions, as well as other metals and synthetic plastics, which can be used in the practice of this invention, can be selected from a broad spectrum of the same with the only proviso that the material selected, exhibit satisfactory thermal and mechanical properties. Thus, the material selected should exhibit satisfactory thermal and mechanical properties, for its intended use.

Examples of satisfactory glass compositions include the following: (A) 12% boron oxide, 80% silica, 5% alkali metal oxide, 3% alumina; and (B) 58% silica, 20% alumina, 9% boron oxide, and 13% alkaline earth oxide. Suitable metals include copper, aluminum, and stainless steel. Satisfactory synthetic plastics include polytetrafluoroethylene and polyolefins.

Best results are achieved when hollow glass fibers or capillaries are used in the practice of this invention because the glass fibers: (1) can be produced in an extremely economical manner; (2) are considered to be resistant to corrosion; (3) can be used, depending on the type of glass at temperatures on the order of 400° C. and at substantially higher temperatures if so desired; (4) withstand internal pressures which are far greater than 100 atmospheres; and (5) may be arranged so that the heat transfer from the absorber to the flow of heat-dissipating liquid is effected by means of the shortest path.

The hollow fibers are advantageously arranged in a single layer or in several layers, wherein said layers form a closed, tightly overlapping surface.

This flat or laminar arrangement can be either self-supporting, as a result of the fibers being connected to one another (adhesively bonded, interwoven, for example by means of thin filaments, etc.) or the fibers may be arranged upon a support.

When the hollow fibers are self-supporting and not mounted upon a support, e.g., a plate, which also can absorb solar radiations, they are generally connected to one another thereby forming a closed surface and simultaneously serve as the absorbing surface of the collecting unit.

The hollow fibers which are arranged in either a single layer or in several layers and in parallel juxtaposition, are preferably united at the facing or opposite openings in order to form larger units. They may, for this purpose, be adhesively bonded or fused into collecting passages. It is also possible for a plurality of hollow fibers to be assembled into a relatively large bundle and for said bundle to be fused or adhesively bonded into one tube.

Figure 2:
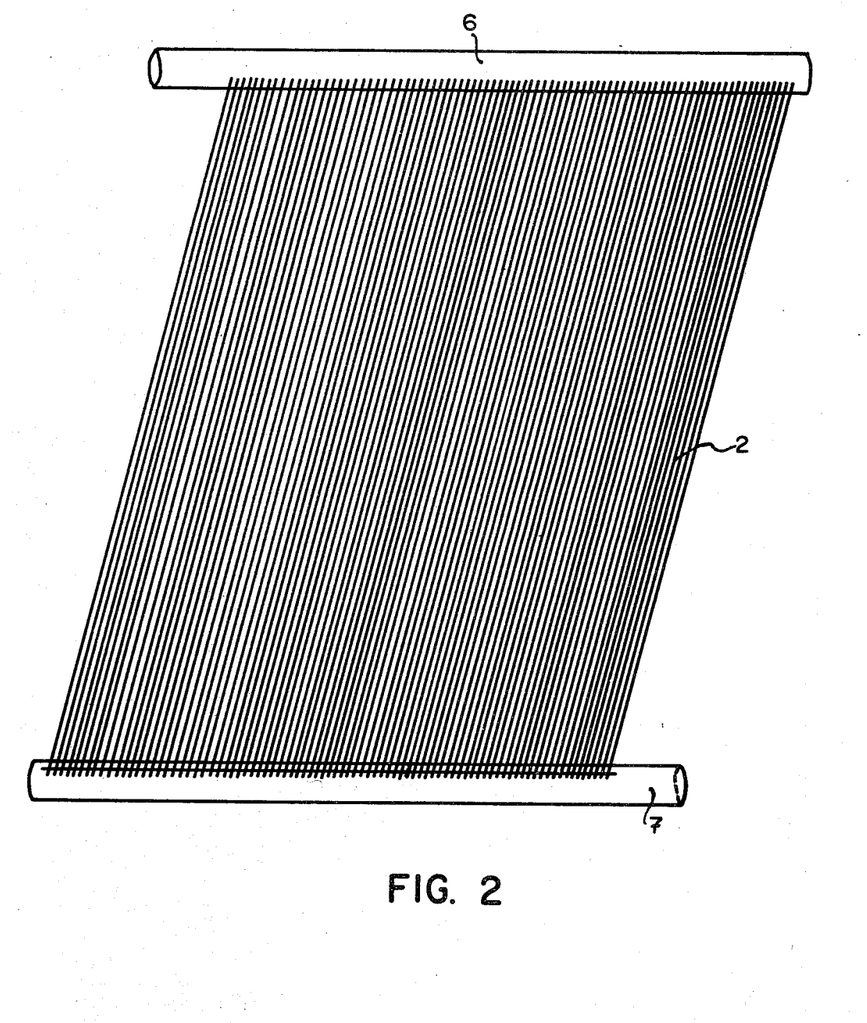
FIG. 2 is a perspective view of a solar energy collector of the present invention wherein the hollow fibers are connected to one another to form a closed surface.

If the solar absorber consists of glass material, then it is far more simple than heretofore possible, to construct an all-glass collecting housing means which, in addition, can also preferably be evacuated (to suppress the loss of heat by conduction and convection) as illustrated in FIG. 2. In contrast, with evacuated collecting units of a conventional design, it is difficult to provide a seal against the external atmospheric pressure. On the other hand, collector housing means which are made entirely of glass can be fused in a manner appropriate to the material after evacuation or can be united by glass solder. The glass collector housing means can be made with the same type of glass used to fabricate the hollow fibers used in this invention.

Figure 3:
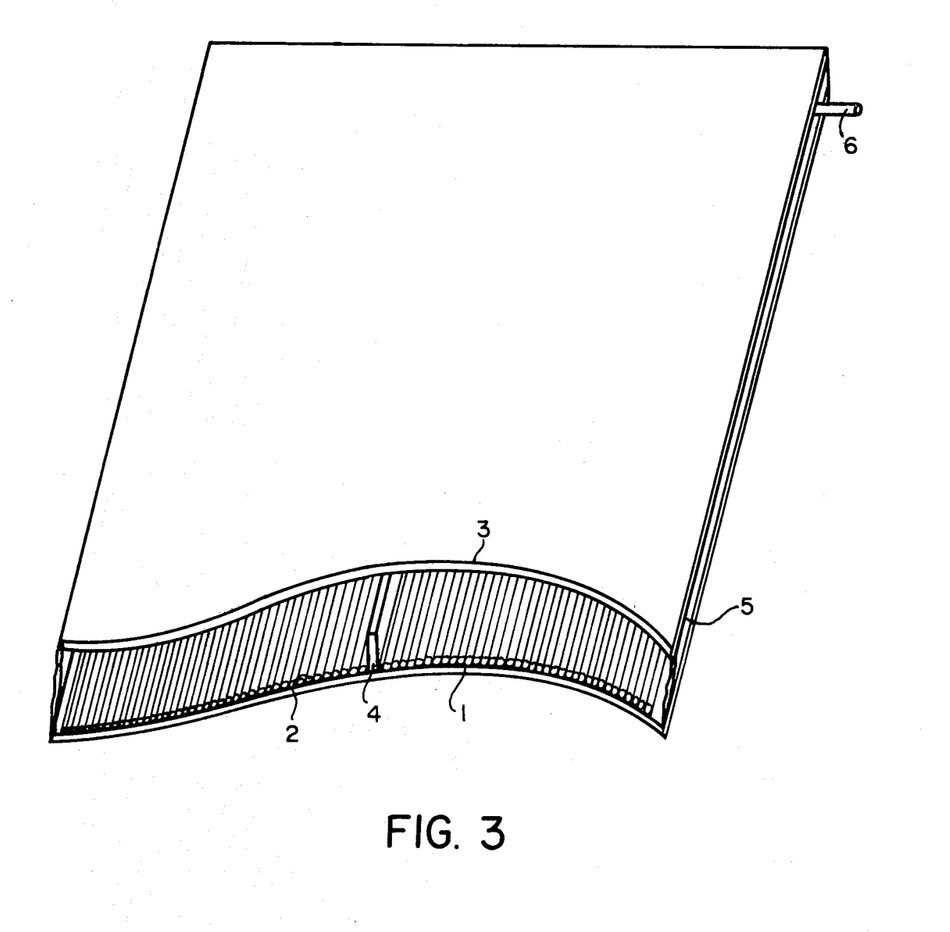
FIG. 3 is a perspective view of still another embodiment of a solar energy collector of the present invention wherein the fibers are fused into the collector to form a vacuum-tight bond between the housing and the hollow fibers.

Two preferred embodiments of this invention are set forth in FIGS. 2 and 3. With reference to the embodiment illustrated in FIG. 2, a solar energy collector is set forth which comprises a plurality of hollow capillary tubes or fibers 2 that form a continuous absorbing surface for the collector. A heat-dissipating medium flows through the tubes or fibers 2. The medium enters into inlet pipe 7 and leaves via outlet pipe 6.

Another embodiment of this invention is illustrated in FIG. 3 wherein the sollar collector comprises hollow glass capillary tubes or fibers 2 and a glass collector housing means which includes bottom glass plate 1, cover glass plate 3 and side wall 5. The remaining walls of the housing are not illustrated. The glass used in the hollow fibers and housing consist of a thermally and mechanically suitable glass, the types of which are well known to those skilled in the art. The housing is vacuum-tight and means 4 is provided to provide support against atmospheric pressure.

With regards to the absorption of solar energy, there are several means of enhancing the absorption of the solar radiation and the transmission of said radiation into the fluid medium flowing into and through the fibers. In the first place, the hollow fibers may be brought into intimate contact with an absorber surface which is preferably blackened, whereby ideal heat transmission is achieved. According to a preferred embodiment of this invention, it is also possible to coat the hollow fibers with a material that would enhance the absorption of the solar radiation, e.g., placing a black coating material on the fibers, or the hollow fibers may be given a black coloring, e.g., incorporating black pigment or coloring materials directly into the material used to fabricate the hollow fibers or capillaries.

Another preferred embodiment of this invention to enhance the absorption of the solar radiation is the incorporation of black coloring or pigment material directly into the heat dissipating liquid or medium.

It is noted that the hollow fibers are either coated with a dark or black material or otherwise given a black coloring either when no support is used for said fibers or when said support is used in combination with said hollow fibers and regardless of whether said support is blackened.

The hollow fibers useful in the practice of this invention generally have an external diameter from about 0.15 to 3 mm, and an inner diameter from about 0.1 to 2.5 mm. Thus, the wall of the capillaries or hollow fibers is between about 0.5 and 2.9 mm. The particular material used to fabricate the hollow fibers useful in the practice of this invention should withstand internal pressures of up to about 250 bar. The length of the hollow fibers is in general from 0.5 to 2.0 m, preferably from 0.8 to 1.6 m so as to avoid too large a pressure drop.

When the hollow fibers are arranged on a support surface and said surface is used to absorb solar radiation, said surface is generally fabricated from various known materials useful for this purpose, including stainless steel and aluminum plates.

The production of capillaries (hollow fibers) has an influence on the possibility of use, both from a technological and also economical point of view. For these reasons, the capillaries, depending on their purpose of use, are preferably produced directly from the glass melt and have an external diameter from about 150 $\mu$m to 3 mm, and an internal diameter from about 100 $\mu$m up to 2.5 mm. Capillaries which are produced in such a way are extremely stable with regards to internal pressure encountered and can be used wherein the internal pressure loading is up to 250 bar. The dimensions employed are dependent upon the type of application, i.e., they are dependent on the amount of energy to be drawn off, which amount should be almost 100% of the irradiated energy. When avoiding too strong heating ($\Delta$T max. 5%), a certain quantity of water is necessary for dissipating this energy. The throughflow of the capillaries may only be connected with a practicable pressure drop, so that the adaptation has to be effected by the procedure of the internal diameter of the capillaries.

It is here that the capillaries offer the advantage that they are extremely resistant to tensile stress (about 300 kp/mm$^2$) so that the supporting plate is strengthened. Furthermore, the capillaries should withstand a high internal pressure, so that, in order to avoid overheating, a by-pass tube may possibly be connected, in parallel, with the collecting unit, wherein the liquid being pumped through said tube may also be pumped in the circulatory system when the total system encounters a big build-up of heat therein. There is no possibility of the glass capillaries breaking as a result of the excess pressure resulting from further radiation.

In the process for manufacturing the hollow fibers or capillaries of this invention, it is desired to coat said hollow fibers or capillaries with materials that are capable of reflecting long-wave infrared radiation thereby significantly reducing heat losses due to radiation exchange. Conventional materials useful for this purpose are well known in the art, and include, e.g., $SnO_2$, $In_2O_3$, $CdO$ and $Cd_2SnO_4$.

Figure 1:
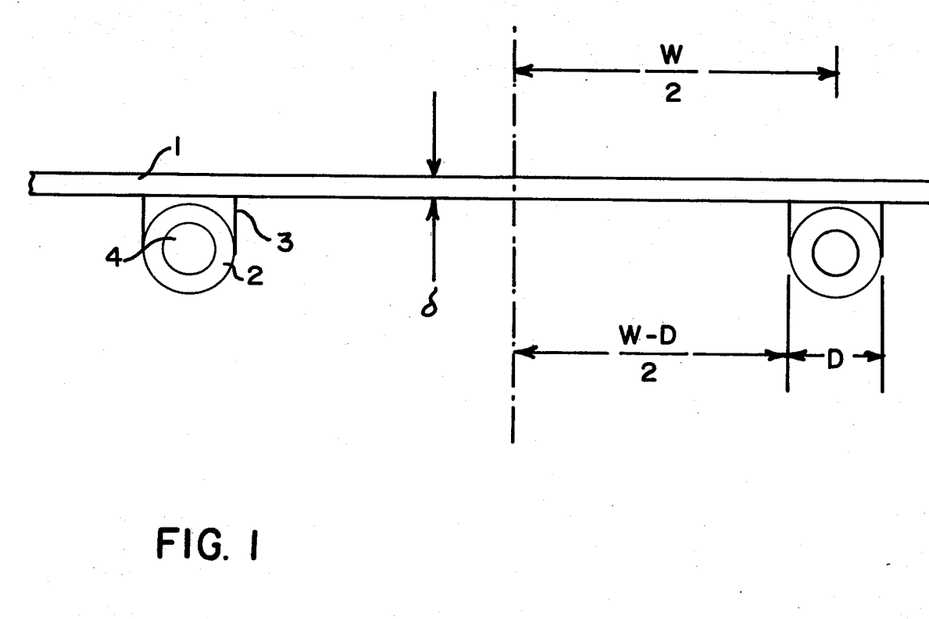
FIG. 1 illustrates one embodiment of a solar collector of the present invention.

Before the invention is more fully described by reference to several examples, it is once again necessary to discuss the advantage which arises from the fact that the radiation which is absorbed and which is converted into heat is supplied by means of a hollow fiber absorber without any detours or by-passes to the heat-dissipating medium. Reference is therefore made to the following Figure:

FIG. 1 shows diagrammatically and in principle the design of the absorber of a flat collector.

A plate 1 which absorbs solar radiation conducts the heat to tubes 2, which are in close contact with the absorbing plate. These tubes are connected via a heat-conducting medium 3 to the plate. The heat-dissipating medium 4 flows in the tubes. The tubes are arranged at a distance W from one another. With regards to flat solar radiation collectors, it is usual to define a so-called "FIN—EFFICIENCY FACTOR" F.[1]

[1] See, e.g., SOLAR ENERGY THERMAL PROCESSES, John Wiley & Sons New York, London, Sydney, Toronto (Duffie, Beckman) 1974.

$$F = \frac{[\tan h\, m\, (W - D) \cdot 1/2]}{m\, (W - D) \cdot 1/2} \text{ with}$$

$$m^2 = \frac{U_L}{K \cdot \delta}$$

W spacing between two tubes
D width of the tubes
$U_L$ heat-loss coefficient of the transparent covering
K heat conductivity of the absorber plate
$\delta$ thickness of the absorber plate F indicates by what smaller factor the relevant absorber construction "collects", as compared with a construction in which the tube spacing is very small, i.e., the tubes bear tightly one against the other.

Furthermore, it is expedient to define a so-called "COLLECTOR EFFICIENCY FACTOR" F'[2]

[2] See, e.g., SOLAR ENERGY THERMAL PROCESSES, John Wiley & Sons, New York, London, Sydney, Toronto (Duffie, Beckman) 1974.

$$F = \frac{1/U_L}{W\left[\frac{1}{U_L D + [(W-D)F]} + \frac{1}{K_b \cdot b/\gamma} + \frac{1}{\pi D_i h_{F,i}}\right]}$$

$K_b$ thermal conductivity of the connecting material
b width of the connection between tube and plate
$\gamma$ average thickness of the connection
$D_i$ internal diameter of the tubes
$h_{F,i}$ heat-transfer factor between liquid and internal tube wall.

F' indicates by what smaller factor the relevant absorber construction "collects" compared with one with which the heat-eliminating liquid would flow directly beneath the black absorber plate.

The closer F and F' are to 1, the better the collection thereof.

Calculated in Tables 1 to 3 are a number of typical examples for F and F'. The heat-loss coefficient $U_L$ of the transparent covering was varied.

$U_L = 7 W/m^2 K$ corresponds to a single-pane covering without any selective coating (neither on the absorber nor on the covering pane), with a mean absorber temperature of 60° C. and a wind velocity of 5 m/sec.

$U_L = 4 W/m^2 K$ corresponds to a two-pane covering with otherwise the same conditions.

$U_L = 2 W/m^2 K$ would be obtained with a two-pane covering, the black absorber being so coated that long-wave infrared is only slightly irradiated ($\Sigma = 0.1$,), for a mean absorber temperature of 80° C. and under calm conditions.

With the hollow fiber absorber (Table 1), W shrinks practically to zero and it is seen that F and F' approach the value of 1.

If an absorber consisting of stainless steel (Table 2) is considered, then it is appreciated that F becomes very small with transparent coverings having a high heat-loss coefficient. It is only with coverings having a small $U_L$ that the installation of such an absorber would be tenable.

What is described in Table 3 is an absorber consisting of aluminum. Here also F and F' are decidedly smaller than with the hollow fiber absorber. The following examples explain the invention.

EXAMPLE 1

A solar collecting unit was produced wherein a glass pane colored black on one side and having glass capillaries with an external diameter of 1 mm and an internal diameter of 0.8 mm, with lengths of 1 meter, adhesively bonded thereon. A total of 990 capillaries were used per square meter of collector surface. The extremely small cavities and the rear side of the capillaries were also dyed black in color. The complete plate was well insulated and was installed with a single covering pane provided with only an air interstice of 15 mm relative to the absorber. The efficiency of this arrangement was established. With the heat-transporting water having a circulating velocity of 180 l/h and an irradiated heat quantity of 620 W/m², there was a rise in temperature of 0.70° C. per m² of collector surface during one hour of operation. In this case, the temperature of the liquid flowing through the capillaries was 60° C. with an outside temperature of 10° C. The fall in pressure through the capillaries amounted to $3.5 \times 10^{-2}$ bar. With a series or parallel connection, the behavior was as expected. The absorption of energy was proportional to the surface as offered. The pressure drop was proportional to the capillary length with the series connection; with the parallel connection, it was inversely proportional to the number of the collector plates.

EXAMPLE 2

The same arrangement, as that described in Example 1 was used, and only the dimensions of the capillaries were varied so as to make the arrangement more stable. The capillaries had an external diameter of 150 μm and an internal diameter of 100 μm. In this case, the external temperature was 10° C., whereas the temperature of the inflowing liquid was 25° C.

The efficiency of the collector was higher in this case, so that there was a rise in temperature of 2° C. per m² of collector surface and per hour of operation. The pressure drop was 28 bar, i.e., the absorber unit had to be preceded by a pressure-raising pump. This disadvantage is compensated for by a tensile strength, of the capillaries, of 270 kp/mm², so that large glass surfaces are also able to be used directly as a roof covering on a roof without any particular supporting means. Furthermore, the high tensile strength of the capillaries permits the collecting unit to be switched off, with maximum heat absorption of the heat storage unit, by a contact valve and a by-pass, without any danger of fracture of the capillaries due to the excess pressure being set up in the capillaries with further heat absorption.

EXAMPLE 3

The capillaries, as described in Example 2, were arranged freely in the evacuated space or chamber between two glass panes fused with soldering glass, being only fused at the rim to the collecting unit. The capillaries projecting from this sandwich arrangement were collectively conducted into a collecting or header tube.

The test conditions corresponded to Example 1.

With such an arrangement, the losss factor is reduced to a minimum, so that a rise in temperature, per square meter of solar energy collector surface and per hour of operation, of 2.3° C., was obtained, even with a large difference in temperature between the outside temperature and the temperature of the throughflowing water.

Generally, from about 150 to 10000 capillaries or hollow fibers and preferably between about 600 and 1000 capillaries are present per square meter of surface area exposed to solar radiation.

Useful fluid mediums used to remove the heat include conventional liquids useful as heat exchange materials, e.g., water, glycols, and glycerol with or without water admixed therewith.

TABLE 1

Collector Efficiency Factor

| R 000 $U_L$ | R 001 $K_{Glass}$ Y/m° | R 002 $\delta$ (m) | R 003 $W$ (m) | R 004 $D$ (m) | R 005 $K_b$ W/m° | R 006 $b$ (m) | R 007 $\gamma$ (m) | R 008 $K_w$ kcal/mhK | R 009 $U$ (m) | R 010 $d_{Tube}$ (m)Wall | K 3 $D_i$ (m) | K 4 $h_{F,i}$ W/m²° | $C_w$ | m | F | F' |
|---|---|---|---|---|---|---|---|---|---|---|---|---|---|---|---|---|
| 8 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 324,443 | 0,9999 | 0,9972 |
| 7 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 303,488 | 0,9999 | 0,9976 |
| 6 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 280,976 | 0,9999 | 0,9979 |
| 5 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 256,495 | 0,9999 | 0,9983 |
| 4 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 229,416 | 0,9999 | 0,9986 |
| 3 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 198,679 | 0,9999 | 0,9990 |
| 2 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 162,221 | 1,0000 | 0,9993 |
| 1,5 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 140,488 | 1,0000 | 0,9995 |
| 1 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 114,708 | 1,0000 | 0,9996 |
| 0,5 | 0,76 | 0,0001 | 1,001·10⁻³ | 0,001 | 1000 | 0,001 | 1·10⁻⁶ | 0,76 | 0,001 | 1·10⁻⁴ | 0,001 | 1500 | 7,6 | 81,111 | 1,0000 | 0,9998 |

Type of Collector: Hollow Fiber Collector

TABLE 2

Collector Efficiency Factor

| R 000 $U_L$ | R 001 K W/m° | R 002 δ (m) | R 003 W (m) | R 004 D (m) | R 005 $K_b$ W/m° | R 006 b (m) | R 007 γ (m) | R 008 $K_w$ kcal/mhK | R 009 U (m) | R 010 $d_{ube}$ (m)Wall | K 3 Di (m) | K 4 $h_Fi_i$ W/m²° | $C_W$ | m | F | F' |
|---|---|---|---|---|---|---|---|---|---|---|---|---|---|---|---|---|
| 8 | 21 | 0,001 | 0,2 | 0,02 | 21 | 0,02 | 0,001 | 180 | 0,02 | 0,001 | 0,02 | 1500 | 3600 | 19,518 | 0,5363 | 0,5756 |
| 7 | 21 | 0,001 | 0,2 | 0,02 | 21 | 0,02 | 0,001 | 180 | 0,02 | 0,001 | 0,02 | 1500 | 3600 | 18,257 | 0,5647 | 0,60144 |
| 6 | 21 | 0,001 | 0,2 | 0,02 | 21 | 0,02 | 0,001 | 180 | 0,02 | 0,001 | 0,02 | 1500 | 3600 | 16,903 | 0,5975 | 0,6313 |
| 5 | 21 | 0,001 | 0,2 | 0,02 | 21 | 0,02 | 0,001 | 180 | 0,02 | 0,001 | 0,02 | 1500 | 3600 | 15,430 | 0,6358 | 0,6662 |
| 4 | 21 | 0,001 | 0,2 | 0,02 | 21 | 0,02 | 0,001 | 180 | 0,02 | 0,001 | 0,02 | 1500 | 3600 | 13,801 | 0,6211 | 0,7077 |
| 3 | 21 | 0,001 | 0,2 | 0,02 | 21 | 0,02 | 0,001 | 180 | 0,02 | 0,001 | 0,02 | 1500 | 3600 | 11,952 | 0,7359 | 0,7577 |
| 2 | 21 | 0,001 | 0,2 | 0,02 | 21 | 0,02 | 0,001 | 180 | 0,02 | 0,001 | 0,02 | 1500 | 3600 | 9,759 | 0,8033 | 0,8194 |
| 1,5 | 21 | 0,001 | 0,2 | 0,02 | 21 | 0,02 | 0,001 | 180 | 0,02 | 0,001 | 0,02 | 1500 | 3600 | 8,4515 | 0,8433 | 0,8560 |
| 1 | 21 | 0,001 | 0,2 | 0,02 | 21 | 0,02 | 0,001 | 180 | 0,02 | 0,001 | 0,02 | 1500 | 3600 | 6,901 | 0,8886 | 0,8976 |
| 0,5 | 21 | 0,001 | 0,2 | 0,02 | 21 | 0,02 | 0,001 | 180 | 0,02 | 0,001 | 0,02 | 1500 | 3600 | 4,879 | 0,9403 | 0,9451 |

Absorber Metal: Steel (1.454)

TABLE 3

| | | | | | | | | Collector Efficiency Factor | | | | | | | | | |
|---|---|---|---|---|---|---|---|---|---|---|---|---|---|---|---|---|---|
| R 000 $U_L$ W/m° | R 001 K W/m° | R 002 $\delta$ (m) | R 003 W (m) | R 004 D (m) | R 005 $K_b$ W/m | R 006 b (m) | R 007 $\gamma$ (m) | R 008 $k_W$ kcal/mhK | R 009 U (m) | R 010 $d_{Tube}$ (m) Wall | K 3 Di (m) | K 4 $h_{F,i}$ W/m²° | $C_W$ | m | F | F' |
| 8 | 221 | 0,001 | 0,2 | 0,02 | 221 | 0,02 | 0,001 | 180 | 0,02 | 0,001 | 0,02 | 1500 | 3600 | 6,02 | 0,913 | 0,906 |
| 7 | 221 | 0,001 | 0,2 | 0,02 | 221 | 0,02 | 0,001 | 180 | 0,02 | 0,001 | 0,02 | 1500 | 3600 | 5,63 | 0,922 | 0,917 |
| 6 | 221 | 0,001 | 0,2 | 0,02 | 221 | 0,02 | 0,001 | 180 | 0,02 | 0,001 | 0,02 | 1500 | 3600 | 5,21 | 0,933 | 0,928 |
| 5 | 221 | 0,001 | 0,2 | 0,02 | 221 | 0,02 | 0,001 | 180 | 0,02 | 0,001 | 0,02 | 1500 | 3600 | 4,76 | 0,943 | 0,939 |
| 4 | 221 | 0,001 | 0,2 | 0,02 | 221 | 0,02 | 0,001 | 180 | 0,02 | 0,001 | 0,02 | 1500 | 3600 | 4,25 | 0,954 | 0,950 |
| 3 | 221 | 0,001 | 0,2 | 0,02 | 221 | 0,02 | 0,001 | 180 | 0,02 | 0,001 | 0,02 | 1500 | 3600 | 3,68 | 0,965 | 0,962 |
| 2 | 221 | 0,001 | 0,2 | 0,02 | 221 | 0,02 | 0,001 | 180 | 0,02 | 0,001 | 0,02 | 1500 | 3600 | 3,01 | 0,976 | 0,974 |
| 1,5 | 221 | 0,001 | 0,2 | 0,02 | 221 | 0,02 | 0,001 | 180 | 0,02 | 0,001 | 0,02 | 1500 | 3600 | 2,61 | 0,982 | 0,981 |
| 1 | 221 | 0,001 | 0,2 | 0,02 | 221 | 0,02 | 0,001 | 180 | 0,02 | 0,001 | 0,02 | 1500 | 3600 | 2,13 | 0,988 | 0,987 |
| 0,5 | 221 | 0,001 | 0,2 | 0,02 | 221 | 0,02 | 0,001 | 180 | 0,02 | 0,001 | 0,02 | 1500 | 3600 | 1,50 | 0,994 | 0,993 |

Absorbent Metal: Aluminum

What is claimed is:

1. In a solar energy collecting unit comprising an absorber means for solar radiation, said absorber means comprising a plurality of hollow capillary tubes wherein said tubes have external diameters between 0.15 and 3 mm and internal diameters between 0.1 and 2.5 mm and said tubes simultaneously form a continuous absorbing surface of said collecting unit, and each of said hollow tubes have a heat-dissipating medium flowing therethrough.

2. The collector unit of claim 1 further comprising from about 150 to 10,000 fibers per square meter of surface area exposed to solar radiation.

3. The collecting unit of claim 1, wherein said hollow tubes consist essentially of glass, metal or synthetic plastic material.

4. The collection unit of claim 3, wherein said hollow tubes are glass.

5. The collection unit of claim 4, wherein said hollow tubes substantially absorb the solar radiation.

6. The collection unit of claim 4, wherein said hollow tubes are transparent for solar radiation and said heat-dissipating medium flowing through said hollow fibers absorbs said solar radiation.

7. The collecting unit of claim 1, wherein said hollow tubes are arranged upon a support surface.

8. The collecting unit of claim 1 wherein said hollow tubes are coated with a material useful for absorbing solar radiation.

9. The collecting unit of claim 7, wherein said hollow tubes are transparent for solar radiation and said heat dissipating medium flowing through said hollow fibers absorbs said radiation.

10. The collecting unit of claim 7, wherein said hollow tubes consist essentially of glass, metal or synthetic material.

11. The collecting unit of claim 10, wherein said hollow tubes are glass.

12. The collecting unit of claim 7 wherein said support surface is aluminum or stainless steel.

13. The collecting unit of claim 1, wherein said hollow tubes consist of glass and said collecting unit further comprises a glass collector housing means for said hollow tubes, said hollow tubes being fused into said collector housing means thereby forming a vacuum-tight bond between said housing and said hollow tubes.

14. The collecting unit of claim 13, wherein said housing, and hollow tubes consist of a thermally and mechanically suitable glass.

15. The collector unit of claim 14, further comprising a thermally and mechanically satisfactory glass bonding composition to produce said vacuum-tight housing between said housing and said hollow tubes.

16. The collecting unit of claim 15 wherein said hollow tubes further comprise a coating which reflects long-wave infrared radiation.

* * * * *